United States Patent
Waddleton et al.

(10) Patent No.: US 11,230,979 B2
(45) Date of Patent: Jan. 25, 2022

(54) AIRCRAFT ENGINE FUEL SYSTEM AND METHOD

(71) Applicant: PRATT & WHITNEY CANADA CORP., Longueuil (CA)

(72) Inventors: David Waddleton, Candiac (CA);
Benjamin Renaud, Montreal (CA);
Sebastien Bergeron, Chambly (CA);
Etienne Plamondon, Candiac (CA);
Jean-Gabriel Gauvreau, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 153 days.

(21) Appl. No.: 16/296,988

(22) Filed: Mar. 8, 2019

(65) Prior Publication Data
US 2020/0284205 A1  Sep. 10, 2020

(51) Int. Cl.
*F02C 9/30* (2006.01)
*F02C 9/36* (2006.01)
*F04D 27/00* (2006.01)
*F04D 29/58* (2006.01)
*F04D 29/40* (2006.01)

(52) U.S. Cl.
CPC ............... *F02C 9/30* (2013.01); *F02C 9/36* (2013.01); *F04D 27/006* (2013.01); *F04D 29/406* (2013.01); *F04D 29/5873* (2013.01); *F05D 2220/323* (2013.01); *F05D 2260/211* (2013.01)

(58) Field of Classification Search
CPC ...... F02C 9/30; F02C 9/36; F02C 9/38; F04D 27/006; F04D 29/406; F04D 29/5873
See application file for complete search history.

(56) References Cited

U.S. PATENT DOCUMENTS

| | | |
|---|---|---|
| 3,656,861 A | 4/1972 | Zagar |
| 3,667,722 A | 6/1972 | Katz |
| 4,449,506 A | 5/1984 | Drutchas |
| 4,948,344 A | 8/1990 | Cygnor |
| 6,022,197 A | 2/2000 | Cygnor et al. |
| 6,059,537 A | 5/2000 | Cygnor |
| 6,527,506 B2 | 3/2003 | Pickelman et al. |
| 7,559,315 B1 | 7/2009 | Yu et al. |
| 8,529,221 B2 | 9/2013 | Futa, Jr |

(Continued)

FOREIGN PATENT DOCUMENTS

| | | |
|---|---|---|
| DE | 943803 C | 6/1956 |
| EP | 636791 A1 | 2/1995 |

*Primary Examiner* — Arun Goyal
(74) *Attorney, Agent, or Firm* — Norton Rose Fulbright Canada LLP

(57) ABSTRACT

A liquid fuel system for an aircraft engine includes a first fuel supply conduit hydraulically connected to a fuel source, a second fuel supply conduit hydraulically connected to the engine, a fuel return conduit hydraulically connected to the second fuel supply conduit, and a fuel pump. The fuel pump has a main inlet hydraulically connected to the first fuel supply conduit, an outlet hydraulically connected to the second fuel supply conduit, and an intermediate inlet hydraulically connected to the fuel return conduit. The intermediate inlet is located between the main inlet and the outlet and in use has a pressure between the main inlet pressure and the outlet pressure. A method of supplying a liquid fuel to an aircraft engine is also described.

17 Claims, 3 Drawing Sheets

(56) References Cited

U.S. PATENT DOCUMENTS

| | | | |
|---|---|---|---|
| 9,869,326 B2 | 1/2018 | Stark et al. | |
| 10,041,497 B2* | 8/2018 | Nyzen | F04D 13/14 |
| 2004/0079081 A1* | 4/2004 | Jevons | F01D 25/12 |
| | | | 60/734 |
| 2013/0320148 A1* | 12/2013 | Lewis | F04D 29/2288 |
| | | | 244/135 R |
| 2016/0186670 A1 | 6/2016 | Oba | |

\* cited by examiner

AIRCRAFT ENGINE FUEL SYSTEM AND METHOD

TECHNICAL FIELD

The application relates to aircraft engine fuel systems.

BACKGROUND

Combustion engines include at least one combustion chamber into which fuel is provided, typically by fuel injectors or fuel nozzles. Some fuel injectors, such as high pressure common-rail injectors, generate a return flow of fuel that can reach high temperatures during engine operation. More specifically, heat is generated as a result of the decrease in pressure of the high pressure fuel from high pressure to low pressure, as the fuel is highly pressurized before being sent to the fuel nozzles, and the return flow is returned back to the relative lower pressure fuel system.

The hot return fuel is returned to somewhere within the fuel system upstream of the fuel system pump(s), the furthest point upstream being the aircraft fuel tank. However, there are considerations in doing so which may be considered undesirable or unacceptable. While suitable for their intended purposes, such prior art fuel systems have drawbacks. For example, in some cases, recirculation of hot fuel to a fuel pump's inlet or to a point upstream of the fuel pump may negatively affect the pump's operational performance, such as the pump's vapor-to-liquid operational performance, under depressed inlet conditions. As another example, returning fuel to the aircraft fuel tank adds fuel weight and the weight of extra hardware required to bring return fuel to the aircraft fuel tank.

In view of the above, improvements to prior art fuel systems technology could be made.

SUMMARY

In one aspect, the present technology provides a liquid fuel system for an aircraft engine. The fuel system includes a first fuel supply conduit hydraulically connected to a fuel source, a second fuel supply conduit hydraulically connected to the engine, a fuel return conduit hydraulically connected to the second fuel supply conduit, and a fuel pump. The fuel pump has a main inlet hydraulically connected to the first fuel supply conduit, an outlet hydraulically connected to the second fuel supply conduit, and an intermediate inlet hydraulically connected to the fuel return conduit. The intermediate inlet is located between the main inlet and the outlet and in use has a pressure between the main inlet pressure and the outlet pressure.

In some embodiments, the fuel pump is a regenerative rotodynamic fuel pump having a housing defining an impeller cavity therein, the main inlet, the intermediate inlet, and the outlet, the impeller cavity housing at least part of an impeller rotatable about a rotation axis to pump fuel from the main inlet to the outlet.

In some embodiments, the intermediate inlet is movable relative to the main inlet between a lower return pressure position and a higher return pressure position.

In some embodiments, the intermediate inlet is movable about the rotation axis of the impeller relative to the main inlet between the lower return pressure position and the higher return pressure position.

In some embodiments, the housing includes a fixed housing portion defining the outlet therein and a movable housing portion defining the intermediate inlet therein, the movable housing portion being movable relative to the fixed housing portion to move the intermediate inlet between the lower return pressure position and the higher return pressure position.

In some embodiments, the housing includes a fixed housing portion defining the outlet therein, and a movable housing portion defining the main inlet therein, the movable housing portion being movable relative to the fixed housing portion to move the intermediate inlet between the lower return pressure position and the higher return pressure position.

In some embodiments, the housing includes a fixed housing portion defining the outlet therein, a first movable housing portion defining the main inlet therein, and a second movable housing portion defining the intermediate inlet therein, and the first and second movable housing portions are movable relative to each other and relative to the fixed housing portion.

In some embodiments, the fuel system further includes an actuator operatively connected to the intermediate inlet, the actuator being operable to move the intermediate inlet between the lower return pressure position and the higher return pressure position.

In some embodiments, the fuel system further includes a controller communicatively coupled to the actuator, the controller being operable to operate the actuator in response to changes in pressure in the fuel return conduit to selectively move the intermediate inlet between the lower return pressure position and the higher return pressure position to regulate the fluid pressure toward an intermediate return pressure setpoint.

In some embodiments, the controller is a proportional-integral-derivative (PID) controller.

In another aspect, the present technology provides a liquid fuel system for an aircraft engine, the fuel system including a first fuel supply conduit adapted to be hydraulically connected to a fuel source, a second fuel supply conduit adapted to be hydraulically connected to the combustion chamber, a fuel return conduit adapted to be hydraulically connected to at least one of the second fuel supply conduit and the combustion chamber for returning at least some fuel unused by the fuel system, and a fuel pump. The fuel pump has a main inlet hydraulically connected to the first fuel supply conduit, an outlet hydraulically connected to the second fuel supply conduit, and an intermediate inlet hydraulically connected to the fuel return conduit. The intermediate inlet is hydraulically connected to the main inlet and the outlet downstream of the main inlet and upstream of the outlet.

In some such embodiments, the intermediate inlet is movable relative to the main inlet.

In some such embodiments, the fuel system further includes an actuator operatively connected to the fuel pump, the actuator being operable to move the intermediate inlet relative to the main inlet in response to changes in pressure in the fuel return conduit.

In some such embodiments, the fuel system further includes a controller communicatively coupled to the actuator, the controller being operable to operate the actuator in response to the changes in the pressure in the fuel return conduit.

In another aspect, the present technology provides a method of supplying a liquid fuel to an aircraft engine. The method includes operating a fuel pump to pump the fuel from a main inlet of the fuel pump toward the engine via an outlet of the pump, and returning at least some of the fuel from downstream of the outlet via an intermediate inlet of the fuel pump to the fuel pump, the intermediate inlet being at a location downstream of the main inlet and upstream of the outlet relative to a direction of fuel flow through the pump.

In some embodiments, the aircraft engine is a gas turbine engine having a combustion chamber, and the operating the fuel pump to pump the fuel to the engine is operating the fuel pump to pump the fuel to the combustion chamber.

In some embodiments, the method further includes, during the operating the fuel pump, in response to a variation in pressure in the intermediate inlet, varying a distance between the intermediate inlet and the main inlet.

In some embodiments, the varying the distance includes decreasing the distance in response to the pressure exceeding an intermediate return pressure setpoint, and increasing the distance in response to the pressure falling below the intermediate return pressure setpoint.

In some embodiments, the varying the distance includes moving a first part of a housing of the fuel pump that defines at least in part an impeller cavity of the fuel pump, the impeller cavity housing at least part of an impeller, relative to a second part of the housing, one of the intermediate inlet and the main inlet being in the first part of the housing, the other one of the intermediate inlet and the main inlet being in the second part of the housing.

In some embodiments, the method further includes receiving a signal at a controller, the signal being indicative of the pressure, and operating, by the controller, an actuator to move the first part of the housing relative to the second part of the housing in response to changes in the pressure to regulate the pressure in the intermediate inlet toward an intermediate return pressure setpoint.

DESCRIPTION OF THE DRAWINGS

Reference is now made to the accompanying figures in which.

DETAILED DESCRIPTION

The present technology is illustrated with respect to a rotodynamic fuel pump that is part of a fuel system for an aeronautical internal combustion engine 10. In the embodiment shown in FIG. 1, the aeronautical internal combustion engine 10 is a turboshaft engine 10. In other embodiments, the aeronautical internal combustion engine 10 is a turbofan engine. In yet other embodiments, the aeronautical internal combustion engine 10 is a rotary engine. It is contemplated that the present technology can be applied to other types of engines as well.

It is also contemplated that the present technology could be implemented into a different type of pump than the one shown in the figures of the present document. For example, it is contemplated that the pump could be a different pump in which fuel pressure rises as fuel moves through the pump from a main inlet of the pump to an outlet of the pump, and which pump may have an intermediate inlet that is positioned intermediate (hydraulically in between) the main inlet and the outlet with respect to the fuel flow through the pump.

For example, it is contemplated that a positive displacement gear type pump could be used in at least some embodiments and/or some applications. As another example, it is contemplated that a multi-stage type pump, or multiple pumps in series, could be used in at least some embodiments and/or some applications.

For the purposes of the present description, the term "fuel conduit" is used to describe an arrangement of one or more elements, such as one or more hoses, connectors and other elements, that together form a flow path or flow paths for a liquid fuel to flow from point A to point B. For example, a given fuel conduit may be defined by any number and combination of hoses hydraulically interconnected in parallel and/or series, by or with one or more fuel filters, switches, pumps, and the like.

Figure 1:
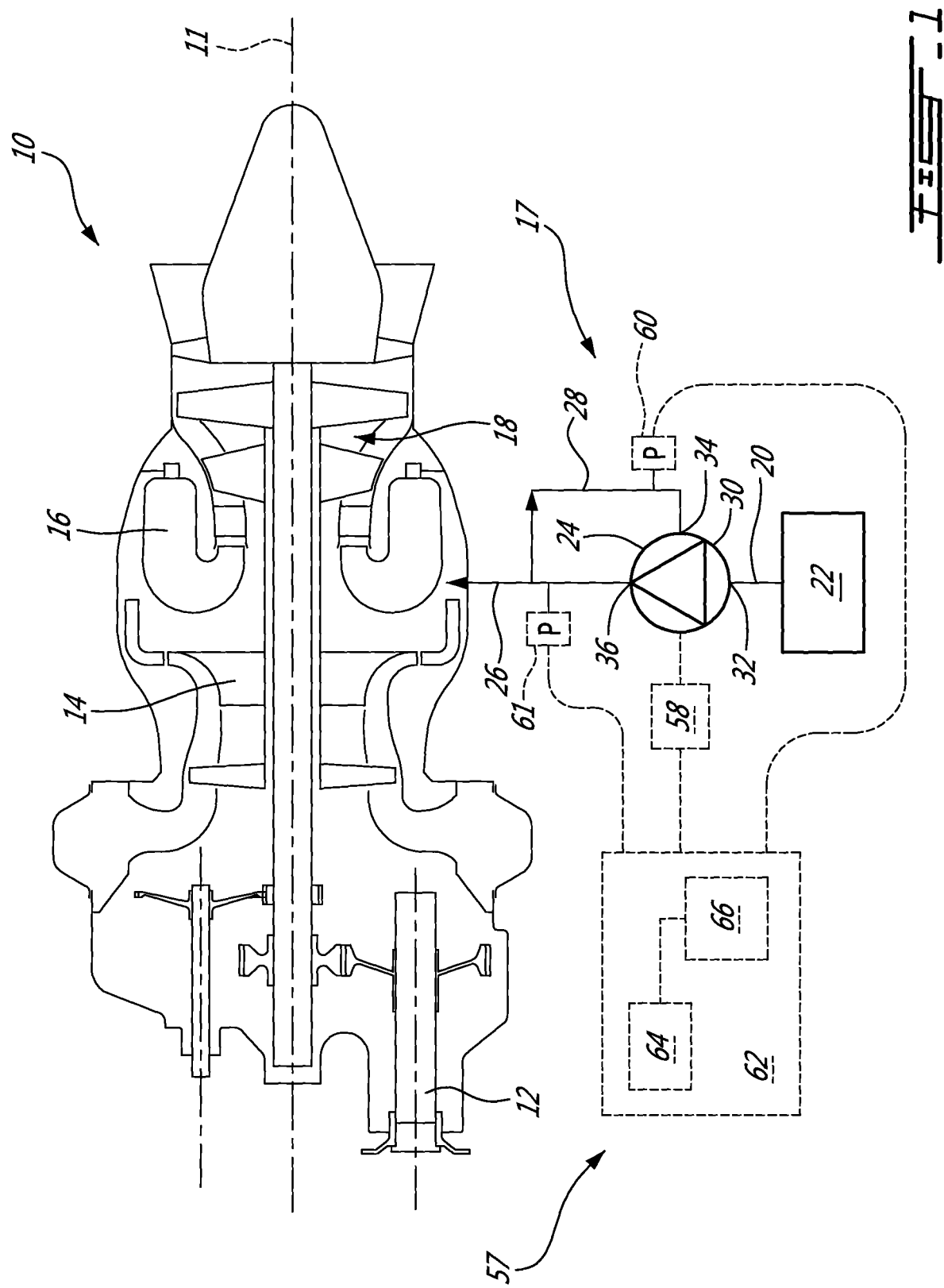
FIG. 1 is a schematic showing an aeronautical turboshaft engine and a part of a fuel system thereof.

FIG. 1 illustrates an aeronautical internal combustion engine 10. In the present non-limiting embodiment, the engine 10 comprises in serial flow communication a shaft 12 for driving a rotor, such as a rotor of a helicopter for example, a compressor section 14 for pressurizing ambient air, a combustion chamber 16 in which the compressed air is mixed with fuel and ignited for generating an annular stream of hot combustion gases, a fuel system 17 that delivers the fuel to the combustion chamber 16, and a turbine section 18 for extracting energy from the combustion gases. Components of the engine 10 are rotatable about a longitudinal center axis 11 of the engine 10.

Figure 2:
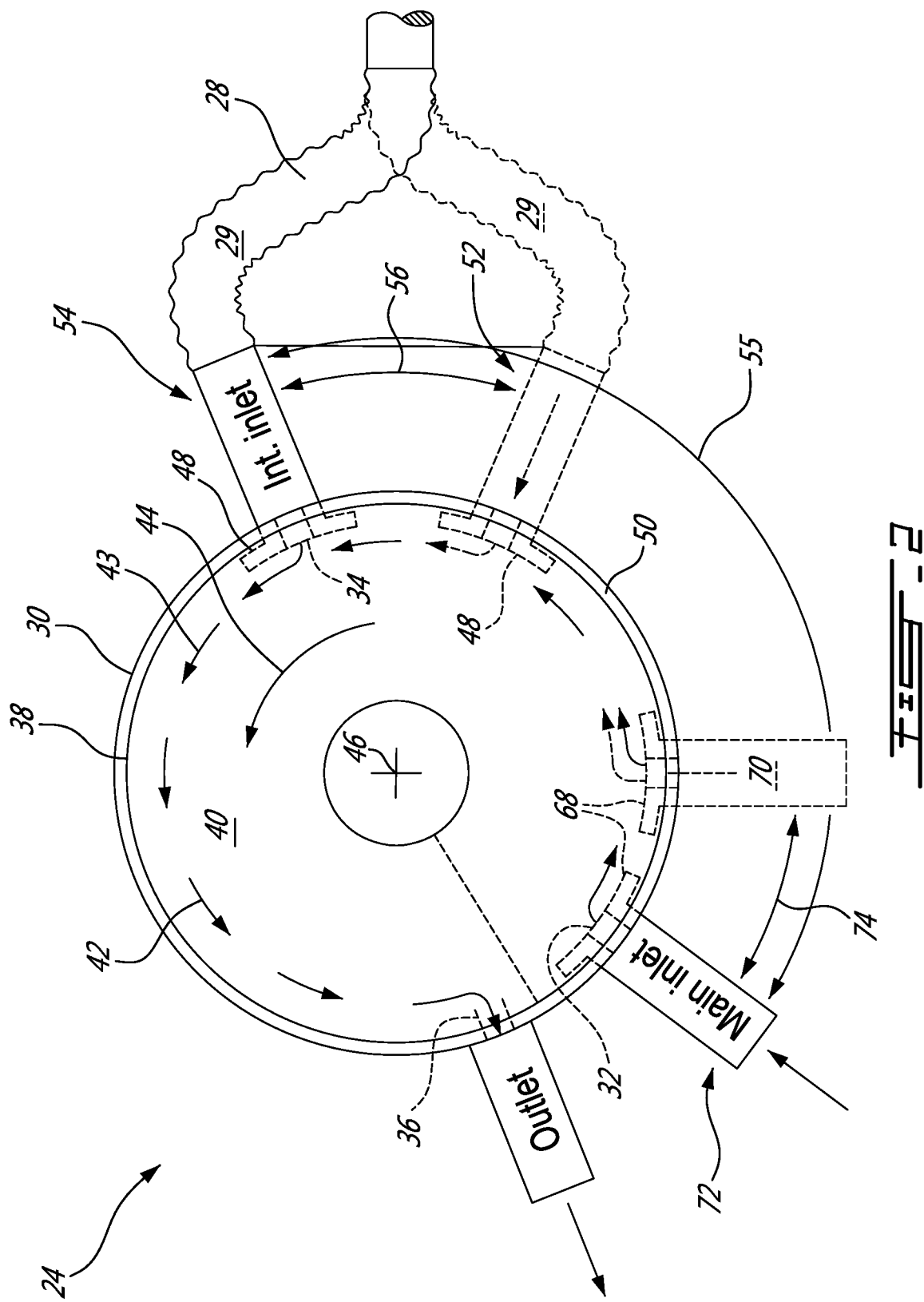
FIG. 2 is a schematic plan view showing a rotodynamic pump of the fuel system of FIG. 2.

Referring to FIGS. 1 and 2, fuel is supplied to the combustion chamber 16 via the fuel system 17 from a fuel source 22 such as a fuel tank of the aircraft with which the engine 10 is used. To this end, in the present embodiment, the fuel system 17 includes a fuel supply conduit 20 that is hydraulically connectable to the fuel source 22. A regenerative rotodynamic pump 24 is hydraulically connected to the fuel supply conduit 20 and to a fuel supply conduit 26.

The fuel supply conduit 26 hydraulically connects the pump 24 to the combustion chamber 16 via one or more fuel injectors, or fuel nozzles, that inject pressurized fuel into the combustion chamber 16. It is contemplated that in some embodiments, the fuel system 17 may include more than one fuel pump, with the pump 24 being one of the pumps. It is contemplated that one or more of the pumps could be upstream of the pump 24 and/or that one or more of the pumps could be downstream of the pump 24 and/or that one or more of the pumps could be hydraulically in parallel with the pump 24, etc, depending on each particular embodiment of the engine 10 and each particular type of aircraft with which the engine 10 is used.

A fuel return conduit 28 returns fuel that is diverted from the combustion chamber 16 and hence not combusted in the combustion chamber 16 (also referred to as "unused fuel") to the pump 24. In the present embodiment, unused fuel is returned from a location (which may differ depending on each particular embodiment of the engine 10 and the fuel system 17) downstream of the pump 24, as described in more detail below. It is contemplated that the fuel system 17 could have a different arrangement of fuel conduits, so long as the functionality described in this document is achieved.

The fuel system 17 may comprise additional elements, such as heat exchanger(s), fuel filter(s), additional pump(s), flow divider(s) and the like (not shown), that may be necessary for operation of the fuel system 17 depending on each particular application of the fuel system 17 and each particular embodiment of the engine 10 and the aircraft with which the fuel system 17 is used. Such additional fuel system elements may be conventional. Therefore, for clarity, such additional fuel system elements are not shown and are not described in detail.

Referring to FIG. 2, the pump 24 includes a housing 30. The housing 30 defines a main pump inlet 32 (or simply main inlet 32), a pump intermediate inlet 34 (or simply intermediate inlet 34), a pump outlet 36 (or simply outlet 36), and an impeller cavity 38. The fuel supply conduit 20 connects to the main inlet 32. The fuel return conduit 28 connects to the intermediate inlet 34. The fuel supply conduit 26 connects to the outlet 36. In the present embodiment, the pump 24 is part of the engine 10. It is contemplated that in some embodiments, the pump 24 could be integrated into the engine 10, such as by at least part of the housing 30, and/or by at least part of one or more of the main inlet 32, the intermediate inlet 34 and the outlet 36, being machined into one or more blocks of the engine 10.

As described in more detail below, in the present embodiment, the intermediate inlet 34 is movable/adjustable, in the present embodiment about the rotation axis 46 of the pump impeller 40, to adjust fluid pressure at the intermediate inlet 34. In some such embodiments, fuel return conduit 28 is defined at least in part by a flexible connector 29, such as a flexible hose, via which the fuel return conduit 28 connects to the intermediate inlet 34. As shown in FIG. 2, the flexible connector 29 accommodates for the movement of the intermediate inlet 34. It is contemplated that any other connections/connectors/construction between the fluid conduits 20, 26 and/or 28 could be used instead, so long as the functionalities of the various embodiments described in this document are provided.

Also as described in more detail below, in some embodiments the main inlet 32 is movable in addition to the intermediate inlet 34 being movable, and in some embodiments instead of the intermediate inlet 34 being movable. In such embodiments, the fuel supply conduit 20 is defined at least in part by a flexible connector, such as a connector similar to the flexible connector 29, which allows for the movement of the main inlet 32. It is contemplated that a different construction, other than via flexible connectors, could be used to allow for the movement of the intermediate inlet 34 and/or the main inlet 32, as the movement is described in this document.

Still referring to FIG. 2, in the present embodiment, an impeller 40 is disposed at least in part in the impeller cavity 38. The impeller 40 is operable to pump fuel from the fuel source 22 via the fuel supply conduit 20 into the main inlet 32 of the pump 24, then through/around the impeller cavity 38 as shown with arrows 42 in FIG. 2, then to the outlet 36, and then to the combustion chamber 16 of the engine 10 via the fuel supply conduit 26 and via the various other fuel system elements that may be part of the fuel system 17. To generate this flow, the impeller 40 is rotatable by a power source, such as a shaft of the turbine engine 10 (with or without an appropriate transmission), in the direction shown with arrow 44 about a rotation axis 46. The impeller 40 may be operated by a dedicated motor or actuator as well.

Referring briefly back to FIG. 1, at least at some times during operation of the fuel system 17 and the engine 10, and depending on each particular application of the fuel system 17 and/or the engine 10 and/or pump 24, at least some of the fuel directed toward the combustion chamber 16 is diverted therefrom (such as via one or more fuel injectors or fuel nozzles of the engine 10) before reaching the combustion chamber 16. In the present embodiment, such diverted/return fuel is recirculated back to the impeller cavity 38 of the pump 24 via the fuel return conduit 28 and the intermediate inlet 34.

To this end, in the present embodiment, the fuel return conduit 28 at one end is hydraulically connected to the fuel supply conduit 26 for receiving unused fuel. It is contemplated that the fuel return conduit 28 could be hydraulically connected to a different part of the fuel system 17 and/or to a part of the engine 10 for recirculating unused fuel from the fuel system 17. Fuel recirculated from a point downstream of the pump 24 via the fuel return conduit 28 is added into the fuel flow 42 in the impeller cavity 38 via the intermediate inlet 34, as shown with arrow 43 in FIG. 2.

Turning back to FIG. 2, in the present embodiment, the intermediate inlet 34 hydraulically connects into the impeller cavity 38 downstream of the main inlet 32 and upstream of the outlet 36, relative to the flow 42 of fuel through the impeller cavity 38. In the present embodiment, the intermediate inlet 34 is defined in a movable housing portion 48 of the housing 30. In the present embodiment, the movable housing portion 48 is movable relative to a fixed housing portion 50 of the housing 30 about the rotation axis 46 of the impeller 40.

As a non-limiting example, in some embodiments, the movable housing portion 48 may be a circumferential plate 48 that is movably/slidably attached to the fixed housing portion 50, either on an inner side of the fixed housing portion 50 as shown in FIG. 2 or on an outer side thereof, via suitable elements such as slits, slots, rails or other suitable elements that slidably mate with one or more portions of the circumferential plate 48. The circumferential plate 48 may thereby be made movable relative to the fixed housing portion 50 about the rotation axis 46 of the impeller 40.

In some such embodiments, the circumferential plate 48 may cover an aperture that may be defined through a periphery of the fixed housing portion 50 and which may extend into the impeller cavity 38. In such embodiments, the intermediate inlet 34 may hydraulically connect to the impeller cavity 38 via that aperture. In some such embodiments, a seal, or other sealing arrangement, could be used between at least a perimeter of the circumferential plate 48 and a perimeter of the aperture covered by the circumferential plate 48 in order to prevent fuel from escaping the impeller cavity 38 via the sliding interface between the circumferential plate 48 and the fixed housing portion 50.

It is contemplated that in some embodiments the aperture could be in the form of a slot extending along a circumferential part of the impeller cavity 38. In some such embodiments, the slot may receive at least a part of the circumferential plate 48 therethrough. It is contemplated that yet other constructions and/or movable arrangements could be used to make the intermediate inlet 34 movable relative to the fixed housing portion 50.

It is contemplated that the construction described above with respect to the intermediate inlet 34 could likewise be used to make the main inlet 32 and/or the outlet 36 movable relative to the fixed housing portion 50 as described in this document. It is also contemplated that the housing 30 could be structured differently than as shown in FIG. 2, such as for example with the movable housing portion 48 being movable along a different path and not necessarily about the rotation axis 46 of the impeller 40.

In the present embodiment, the fixed housing portion 50 defines the outlet 36 therein. The intermediate inlet 34 is thus movable relative to both the main inlet 32 and to the fixed housing portion 50 between a lower return pressure position 52 and a higher return pressure position 54. As seen in FIG. 2, a hydraulic distance 55 between the main inlet 32 and the intermediate inlet 34 is smaller, and thus the intermediate inlet 34 is hydraulically closer to the main inlet 32, in the lower return pressure position 52 than in the higher return pressure position 54. Movement of the intermediate inlet 34 between the positions 52 and 54 is shown with a double-ended arrow 56. As shown in FIG. 2, the hydraulic distance 55 is also angular distance, and more particularly a distance which fuel needs to travel through the impeller cavity 38 from the main inlet 32 to reach the intermediate inlet 34.

It is contemplated that the housing 30 could be constructed such that the outlet 36 would be movable with the intermediate inlet 34 relative to the main inlet 32, so as to change, or adjust, the distance 55 between the main inlet 32 and the intermediate inlet 34, to provide the functionality described in this document. It is contemplated that in some such alternative embodiments, the main inlet 32 could be fixed relative to the fixed housing portion 50, while in other such alternative embodiments the main inlet 32 could be movable relative to the fixed housing portion 50.

It is contemplated that the housing 30 and/or other components of the pump 24 could be constructed differently to define the distance 55 differently, while providing for the functionality of the pump 24 as described in this document. It is also contemplated that in some embodiments of the fuel system 17, the main inlet 32, the intermediate inlet 34, and the outlet 36 could all be fixed relative to the housing 30.

Still referring to FIG. 2, since pressure of fuel pressure rises as fuel passes through the impeller cavity 38 by the impeller 40 from the main inlet 32 toward the outlet 36, the fuel pressure at the intermediate inlet 34 is higher the larger the distance 55 is between the intermediate inlet 34 and the main inlet 32. That is, the farther downstream the intermediate inlet 34 is from the main inlet 32 in the impeller cavity 38, the higher the fuel pressure at the intermediate inlet 34. Accordingly, the fuel pressure at the intermediate inlet 34 is lower in the lower return pressure position 52 (at which the distance 55 is smaller) than in the higher return pressure position 54 (at which the distance 55 is larger). Notably, since the intermediate inlet 34 is downstream of the main inlet 32 and upstream of the outlet 36, in all of its possible positions, the fuel pressure at the intermediate inlet 34 is higher than at the main inlet 32 and lower than at the outlet 36.

For simplicity, the fuel pressure at the intermediate inlet 34 is further referred to as "intermediate return pressure". The present technology uses the variable distance(s) and/or relative positions between the main inlet 32 and the intermediate inlet 34, and/or the outlet 36, to control the intermediate return pressure at the intermediate inlet 34 while the pump 24 is in use. In some embodiments in which the distance between the main inlet 32 and the outlet 36 is variable, such as when the main inlet 32 and/or the outlet 36 is/are movable relative to the impeller cavity 38, a delivery pressure of fuel at the outlet 36 can also be controlled by varying a hydraulic/angular distance, in the impeller cavity 38, between the main inlet 32 and the outlet 36.

Referring back to FIG. 1, for moving/adjusting at least one of the main inlet 32, the intermediate inlet 34, and the outlet 36 relative to at least another one of the main inlet 32, the intermediate inlet 34, and the outlet 36, an active pressure regulating mechanism 57 may be used. The active pressure regulating mechanism 57 includes an actuator 58 and a pressure sensor(s) 60 that are communicatively coupled to a controller 62. It is contemplated that more than one actuator 58 and/or more than one sensor 60 and/or more than one controller 60 could be used to provide the functionality of the pump 24 described in this document.

As shown in FIG. 1, in the present embodiment, the actuator 58 is operatively connected, via suitable gearing and/or links for example, to the movable housing portion 48 that defines the intermediate inlet 34. The actuator 58 is thus operable to selectively move the movable housing portion 48, and the intermediate inlet 34, between the lower return pressure position 52 and the higher return pressure position 54 of the intermediate inlet 34.

As explained later in this document, in some embodiments the main inlet 32 is movable in addition to or instead of the intermediate inlet 34 in order to vary, or adjust, the distance 55 between the main inlet 32 and the intermediate inlet 34. In such alternative embodiments, the actuator(s) 58 is/are operatively connected to at least one of the main inlet 32 and the intermediate inlet 34 to provide the variable distance 55 between the main inlet 32 and the intermediate inlet 34. In such embodiments, the distance 55 may be said to be adjustable.

In some embodiments, the actuator 58 is an electro-hydraulic servo valve. In other embodiments, the actuator 58 is a different type of actuator. For example, it is contemplated that the actuator 58 could be a hydraulic actuator operable via at least one corresponding electronically operated hydraulic valve (not shown) that is communicatively coupled to the controller 62. It is also contemplated that any suitable hydro-mechanical actuator could be used.

As shown in FIG. 1, in the present embodiment, the pressure sensor 60 is hydraulically connected to the fuel return conduit 28 that connects to the intermediate inlet 34 of the pump 24 at a location suitable for sensing the intermediate return pressure. The pressure sensor 60 generates a signal that is indicative of, directly or indirectly, the intermediate return pressure. It is contemplated that the pressure sensor 60 could be any suitable pressure sensor and/or could be connected elsewhere in the fuel system 17 to provide the intermediate return pressure, directly or indirectly. It is also contemplated that more than one pressure sensors 60 could be used to provide, or derive, the intermediate return pressure.

In some embodiments, the intermediate return pressure is used for feedback sensing. In some embodiments, additional one or more pressure sensors 61 are provided for sensing fuel pressure at the outlet 36 of the pump 24. In some embodiments, outlet pressure sensor(s) 61 is/are used to control the outlet pressure of the pump 24, as described below for example. In some embodiments, the fuel system 17 omits one or more of, or all of the pressure sensors 60, 61 and is instead ported to provide hydraulic pressure feedback with respect to the intermediate return pressure and/or the outlet pressure.

In the present embodiment, and still referring to FIG. 1, the controller 62 includes a processor 64 and a non-transient memory 66 communicatively coupled to the processor 64. The non-transient memory 66 has processor-executable instructions thereon which, when executed by the processor 64, cause the controller 62 to execute a proportional-integral-derivative (PID) control algorithm to operate the actuator(s) 58 in response to the signal from the pressure sensor(s) 60 and to thereby regulate the intermediate return pressure toward the intermediate return pressure setpoint.

In embodiments implementing a PID control algorithm, the intermediate return pressure is an input to the PID control algorithm. It is contemplated that a different type of control algorithm could be used. It is also contemplated that a different type of controller could be used. For example, it is contemplated that a hydraulically and/or pneumatically operated controller could be used.

In the present embodiment, the controller 62 regulates the intermediate return pressure toward, and in some embodiments also to, the intermediate return pressure setpoint by selectively operating the actuator 58 and thereby moving the movable housing portion 48, and therefore the intermediate inlet 34, relative to the fixed housing portion 50. For example, in response to the intermediate return pressure falling below the intermediate return pressure setpoint, the controller 62 moves (or adjusts the relative position of) the intermediate inlet 34 in a direction from the lower return pressure position 52 toward the higher return pressure position 54 to increase the intermediate return pressure toward the intermediate return pressure setpoint.

As another example, in response to the intermediate return pressure rising above, or exceeding, the intermediate return pressure setpoint, the controller 62 moves (or adjusts the relative position of) the intermediate inlet 34 in a direction from the higher return pressure position 54 toward the lower return pressure position 52 to decrease the intermediate return pressure toward the intermediate return pressure setpoint.

The controller 62 executes the movements/displacements described above in corresponding sequences to counteract changes of the intermediate return pressure to maintain the intermediate return pressure at or near the intermediate return pressure setpoint. In some embodiments, the controller 62 executes movements/displacements of the intermediate inlet 34 in corresponding sequences, according to similar principles as the principles described above, to regulate the outlet pressure toward, and in some cases also to, an outlet pressure setpoint based on one or more signals, such as from the sensor(s) 61 for example.

In embodiments in which the main inlet 32 and/or the outlet 36 are movable, either instead of or in addition to the intermediate inlet 34 being movable, the actuator(s) 48 correspondingly moves/displaces the main inlet 32 and/or the outlet 36 to regulate the intermediate return pressure toward the intermediate return pressure setpoint and/or to regulate the outlet pressure toward/to an outlet pressure setpoint. Some such alternative embodiments are described next.

As schematically shown in dashed lines in FIG. 2, in some alternative embodiments, instead of the main inlet 32 being defined in the fixed housing portion 50, the main inlet 32 is defined in a movable housing portion 68 of the housing 30. In some such embodiments, the moveable housing portion 68, and therefore the main inlet 32, is movable relative to the fixed housing portion 50 between a lower pressure differential position 70 and a higher pressure differential position 72, as shown with a double-ended arrow 74.

In the higher pressure differential position 72 the main inlet 32 is hydraulically farther from the outlet 36 than in the lower pressure differential position 70. In the present embodiment, as seen in FIG. 2, being hydraulically farther translates to the main inlet 32 being located at a relatively larger angular distance from the outlet 36 than in the lower pressure differential position 70. Due to the increasing pressure of fuel from the main inlet 32 toward the outlet 36, the pump 24 adds more kinetic energy, and hence more pressure, to the fuel when the main inlet 32 is in the higher pressure differential position 72 than when the main inlet 32 is in the lower pressure differential position 70.

In other embodiments, the outlet 36 is movable by the actuator 58, either instead of or independently of the main inlet 32, relative to the impeller cavity 38 between a lower pressure differential position and a higher pressure differential position and thus changes the hydraulic distance, and in the present embodiment the relative angular distance, between the main inlet 32 and the outlet 36 to regulate the pressure differential provided by the pump 24.

Still referring to FIG. 2, in some embodiments in which the main inlet 32 is movable, the intermediate inlet 34 is fixed relative to the fixed housing portion 50, for example by being defined in the fixed housing portion 50. In such embodiments, the intermediate inlet 34 is effectively movable between its lower return pressure position and its higher return pressure position by movement of the main inlet 32 between the lower pressure differential position 70 and the higher pressure differential position 72. This is because movement of the main inlet 32 adjusts the hydraulic distance/relative angular distance 55, within in the impeller cavity 38, between the main inlet 32 and the intermediate inlet 34, in a similar way as does movement of the intermediate inlet 34 relative to the impeller cavity 38.

In such alternative embodiments, the actuator 58 is operatively connected to the movable housing portion 68 that defines the main outlet 32, via suitable gearing and/or links for example, and is operable to selectively move the movable housing portion 68 and the main inlet 32. In such embodiments, the actuator 58 moves the main inlet 32 toward its lower pressure differential position 70 to lower the intermediate return pressure (and the delivery/outlet pressure at the outlet 36), and toward its higher pressure differential position 72 to increase the intermediate return pressure (and the delivery pressure at the outlet 36). In other words, in such embodiments, the actuator 58 regulates the hydraulic/angular distance 55 between the intermediate inlet 34 and the main inlet 32 by moving the main inlet 32 instead of moving the intermediate inlet 34, according to the same principles as described above with respect to the embodiments in which only the intermediate inlet 34 is movable.

Further, as schematically shown in FIG. 2, in yet other embodiments, both the main inlet 32 and the intermediate inlet 34 are defined in respective movable housing portions 48, 68 of the housing 30 and are movable relative to each other and relative to the fixed housing portion 50 to regulate the hydraulic/angular distance 55 and hence the intermediate return pressure. In such embodiments, the intermediate return pressure is regulated in a similar way, by operating the actuator(s) 58 to regulate the distance 55 between the main inlet 32 and the intermediate inlet 34 by moving one or both of the main inlet 32 and the intermediate inlet 34 relative to each other.

In such embodiments, the main inlet 32 is movable by the actuator(s) 58 to regulate the delivery pressure of the fuel at the outlet 36 of the pump 24 toward a delivery pressure setpoint, by selectively moving the main inlet 32 between the lower pressure differential position 70 and the higher pressure differential position 72. In some such embodiments, each of the main inlet 32 and the intermediate inlet 34 is operatively connected to an independent actuator 58, with each actuator 58 being communicatively coupled to the controller 62. In some such embodiments, the actuators 58 are operable to move the main inlet 32 and the intermediate inlet 34 independent of each other to regulate both the intermediate return pressure and the delivery pressure.

In the above example embodiments, the active pressure regulating mechanism 57 (FIG. 1) is used. It is contemplated that in some embodiments, a passive pressure regulating mechanism (not shown) could be used to regulate the intermediate return pressure, such as a spring-loaded piston or hydraulic valve assembly.

Figure 3:
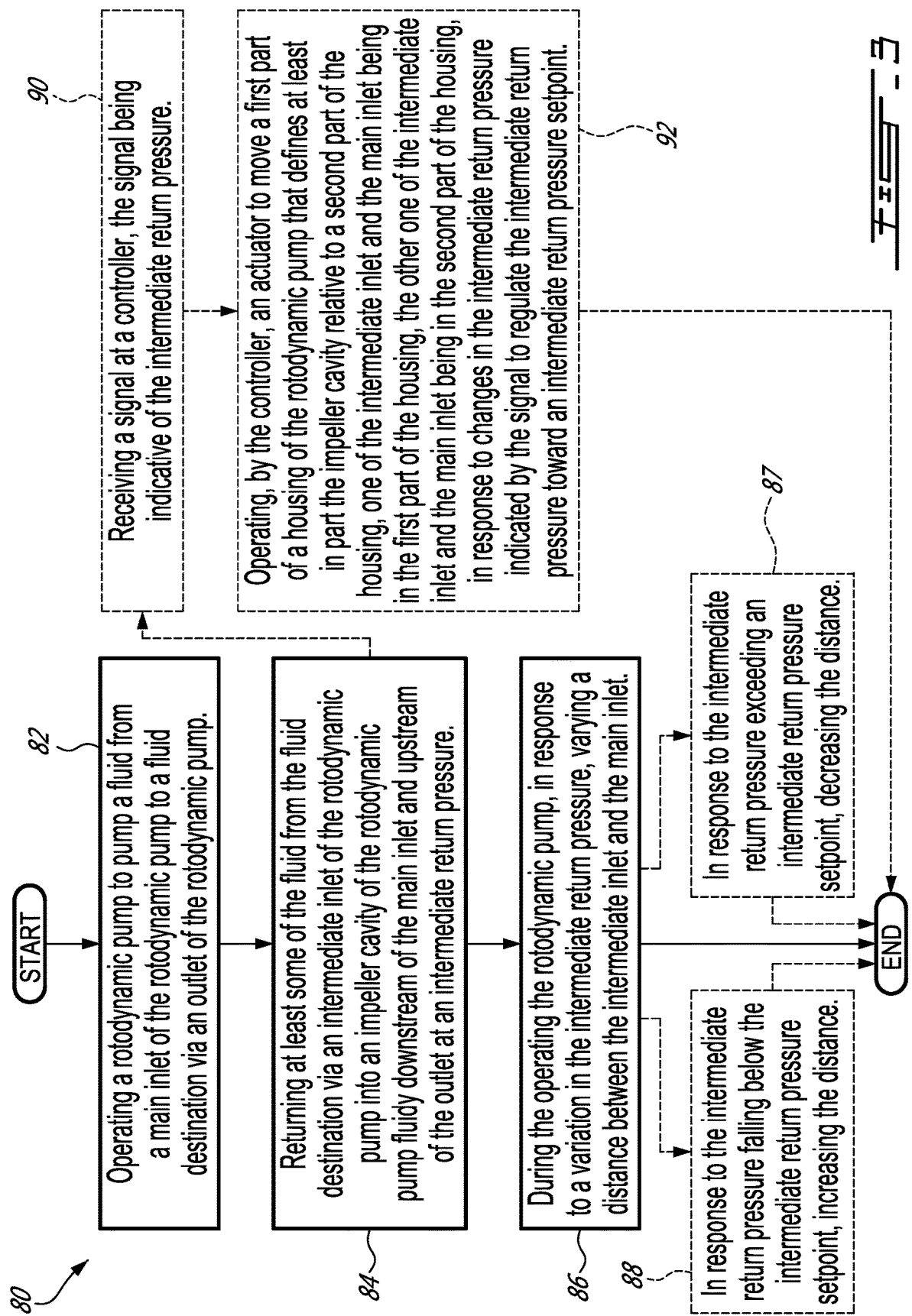
FIG. 3 is a logic flow diagram showing a method of operating the rotodynamic pump of FIG. 2.

Now referring to FIG. 3, and with the above embodiments in mind, the present technology provides a method 80 of regulating an intermediate return pressure of fuel supplied by a rotodynamic pump 24. While the method 80 is illustrated with respect to supplying fuel to the combustion chamber 16 of the engine 10, it is contemplated that the method could also have other applications and/or be utilized with fluids other than fuel.

In the present embodiment, the method 80 may start at step 82, at which a pump, such as the pump 24, is operated to pump a fuel from a main inlet 32 of the pump 24 to a fluid destination, such as the combustion chamber 16, via an outlet 36 of the pump 24 by imparting kinetic energy to the fuel.

The method 80 may further include step 84. Step 84 may include returning at least some of the fuel from the fluid destination 16 (i.e. from a point downstream of the pump 24) via an intermediate inlet 34 of the pump 24 into an intermediate location within the impeller cavity 38 of the pump 24 hydraulically downstream of the main inlet 32 and upstream of the outlet 36, with the fuel being at the intermediate return pressure at the intermediate inlet 34.

The method 80 may further include step 86. Step 86 may be executed during operation the pump 24 in response to a variation in the intermediate return pressure. Step 86 may include varying a hydraulic/angular distance 55 between the intermediate inlet 34 and the main inlet 32.

In some embodiments, and depending on the particular embodiment of the pump 24 for example, the method 80 may include a step 87. Step 87 may be executed during operation the pump 24 in response to the intermediate return pressure exceeding an intermediate return pressure setpoint. Step 87 may include decreasing a distance 55 between the intermediate inlet 34 and the main inlet 32. Depending on the particular embodiment of the pump 24, step 87 may include moving the intermediate inlet 34 toward the main inlet 32. In some embodiments, such as where both the main inlet 32 and the intermediate inlet 34 are movable, moving the intermediate inlet 34 toward the main inlet 32 may include moving both or one of the intermediate inlet 34 and the main inlet 32 toward from each other.

Also, in some embodiments, and depending on the particular embodiment of the pump 24 for example, the method 80 may further include step 88. Step 88 may be executed during operation the pump 24 in response to the intermediate return pressure falling below the intermediate return pressure setpoint. Step 88 may include increasing the distance 55 between the intermediate inlet 34 and the main inlet 32. Depending on the particular embodiment of the pump 24, step 88 may include moving the intermediate inlet 34 away from the main inlet 32. In some embodiments, such as where both the main inlet 32 and the intermediate inlet 34 are movable, moving the intermediate inlet 34 away from the main inlet 32 may include moving both or one of the intermediate inlet 34 and the main inlet 32 away from each other.

As seen from the examples of different embodiments of the pump 24 above, the moving the intermediate inlet 34 includes moving a first part of a housing 30 of the pump 24 that defines at least in part the impeller cavity 38 relative to a second part of the housing 30, with one of the intermediate inlet 34 and the main inlet 32 being in the first part of the housing 30, and the other one of the intermediate inlet 34 and the main inlet 32 being in the second part of the housing 30. It is contemplated that the housing 30 could be constructed so as to vary the hydraulic/angular distance between the intermediate inlet 34 and the main inlet 32 by moving at least one part of the housing 30 that does not define either of intermediate inlet 34 and the main inlet 32. It is contemplated that in some such alternative embodiments, at least some of, or all of, the main inlet 32, the intermediate inlet 34, and the outlet 36 could be fixed relative to the impeller cavity 38 and/or the fixed housing portion 50.

In embodiments in which an active pressure regulating mechanism, such as the active pressure regulating mechanism 57, is used to regulate the intermediate return pressure, the method 80 may include steps 90 and 92. Step 90 may include receiving a signal at a controller 62, the signal being indicative of the intermediate return pressure. It is contemplated that the signal could be digital or analog, and could be transmitted to the controller 62 hydraulically, mechanically, or electrically/electronically via wire or wirelessly using a suitable corresponding transmission means, and depending on each particular embodiment of the pressure sensor(s) 60 and/or each particular embodiment of the controller 62. For example, it is contemplated that the signal could be a pneumatic or a hydraulic analog signal, transmitted to the controller 62 via air or a suitable hydraulic fluid.

Step 92 may include operating, by the controller 62, an actuator 58 (or more than one corresponding actuators 58 depending on the particular embodiment of the pump 24) to vary the distance 55 between the main inlet 32 and the intermediate inlet 34 in response to changes in the intermediate return pressure indicated by a signal from one or more pressure sensor 60, to regulate the intermediate return pressure toward, and in some cases also to, an intermediate return pressure setpoint.

In some embodiments, the controller 62 operates an actuator 58 (or more than one corresponding actuators 58 depending on the particular embodiment of the pump 24) to vary the hydraulic/angular distance 55 between the main inlet 32 and the intermediate inlet 34, and/or a hydraulic/angular distance between the main inlet 32 and the outlet 36, in response to changes in the outlet pressure indicated by a signal from the pressure sensor(s) 61 for example, to regulate the outlet pressure toward, and in some cases also to, an outlet pressure setpoint.

In some such alternative embodiments, the pump 24 does not have an intermediate inlet 34 and instead one of the main inlet 32 and the outlet 36 is movable relative to the fixed housing portion 50, or both the main inlet 32 and the outlet 36 are movable relative to the fixed housing portion 50 and relative to each other, by one or more actuators 58 to vary/adjust the hydraulic/angular distance 55 between the main inlet 32 and the outlet 36 and to thereby regulate the outlet pressure at the outlet 36.

In such embodiments, the actuator(s) 58 move(s) the main inlet 32 relative to the outlet 36, or vice versa, to increase the hydraulic/angular distance 55 to increase the outlet pressure in response to the outlet pressure dropping below an outlet pressure setpoint, and to decrease the hydraulic/angular distance 55 to decrease the outlet pressure in response to the outlet pressure rising above the outlet pressure setpoint. It is contemplated that in at least some embodiments in which the pump 24 excludes an intermediate inlet, return fuel could be returned to a point in the fuel system 19 upstream of the impeller 40. It is also contemplated that in some such cases, and depending on the particular embodiment of the engine 10, the fuel system 19 may not generate return fuel and thus may exclude the return fuel conduit.

In some embodiments having an active pressure regulating mechanism, and depending on the each particular embodiment of the pump 24, step 92 of the method 80 may include operating, by the controller 62, the actuator(s) 58 to move a first part of the housing 30 relative to a second part of the housing 30 to change the hydraulic/angular distance 55 between the main inlet 32 and the intermediate inlet 34 in response to changes in the intermediate return pressure indicated by a signal from one or more pressure sensor 60, to regulate the intermediate return pressure toward an intermediate return pressure setpoint, and/or (in some embodiments) in response to a signal from the pressure sensor(s) 61 to regulate the outlet pressure toward the outlet pressure setpoint.

In at least some embodiments utilizing the PID controller 62, the operating the actuator 58 includes executing, by the controller 62, a proportional-integral-derivative (PID) control algorithm with the intermediate return pressure being an input to the PID control algorithm. In other embodiments, other control algorithms are used.

Any suitable materials, construction and manufacturing methods could be used to construct the fuel system 17, including the movable/adjustable fluid connections and corresponding parts of the pump 24, described above. It is contemplated that the intermediate return pressure setpoint may be dictated by each particular application of the pump 24.

The above description is meant to be exemplary only, and one skilled in the art will recognize that changes may be made to the embodiments described without departing from the scope of the invention disclosed. As mentioned, the described fuel system may be used with any suitable aircraft engine system, and with any suitable liquid fuel pump type. Still other modifications which fall within the scope of the present invention will be apparent to those skilled in the art, in light of a review of this disclosure, and such modifications are intended to fall within the appended claims.

The invention claimed is:

1. A liquid fuel system for an aircraft engine, the fuel system comprising:
   a first fuel supply conduit hydraulically connected to a fuel source,
   a second fuel supply conduit hydraulically connected to the engine,
   a fuel return conduit hydraulically connected to the second fuel supply conduit, and
   a fuel pump having a main inlet hydraulically connected to the first fuel supply conduit, an outlet hydraulically connected to the second fuel supply conduit, and an intermediate inlet hydraulically connected to the fuel return conduit, the intermediate inlet located between the main inlet and the outlet and in use having a pressure between a pressure at the main inlet and a pressure at the outlet, the intermediate inlet movable relative to the main inlet about a rotation axis of the fuel pump between a lower return pressure position and a higher return pressure position.

2. The fuel system of claim 1, wherein the fuel pump is a regenerative rotodynamic fuel pump having a housing defining an impeller cavity therein, the main inlet, the intermediate inlet, and the outlet, at least part of an impeller disposed in the impeller cavity and rotatable about the rotation axis to pump fuel from the main inlet to the outlet.

3. The fuel system of claim 2, wherein the intermediate inlet is movable about the rotation axis of the impeller relative to the main inlet between the lower return pressure position and the higher return pressure position.

4. The fuel system of claim 2, wherein the housing includes a fixed housing portion defining the outlet therein and a movable housing portion defining the intermediate inlet therein, the movable housing portion being movable relative to the fixed housing portion to move the intermediate inlet between the lower return pressure position and the higher return pressure position.

5. The fuel system of claim 2, wherein the housing includes a fixed housing portion defining the outlet therein, and a movable housing portion defining the main inlet therein, the movable housing portion being movable relative to the fixed housing portion to move the main inlet between the lower return pressure position and the higher return pressure position.

6. The fuel system of claim 2, wherein the housing includes a fixed housing portion defining the outlet therein, a first movable housing portion defining the main inlet therein, and a second movable housing portion defining the intermediate inlet therein, and the first movable housing portion and the second movable housing portion are movable relative to each other and relative to the fixed housing portion.

7. The fuel system of claim 1, further comprising an actuator operatively connected to the intermediate inlet, the actuator being operable to move the intermediate inlet between the lower return pressure position and the higher return pressure position.

8. The fuel system of claim 7, further comprising a controller communicatively coupled to the actuator, the controller being operable to operate the actuator in response to changes in pressure in the fuel return conduit to selectively move the intermediate inlet between the lower return pressure position and the higher return pressure position to regulate a fluid pressure toward an intermediate return pressure setpoint.

9. The fuel system of claim 8, wherein the controller is a proportional-integral-derivative (PID) controller.

10. A liquid fuel system for an aircraft engine, the fuel system comprising:
    a first fuel supply conduit adapted to be hydraulically connected to a fuel source,
    a second fuel supply conduit adapted to be hydraulically connected to a combustion chamber,
    a fuel return conduit adapted to be hydraulically connected to the second fuel supply conduit for returning at least some fuel directed toward the combustion chamber, and
    a fuel pump comprising:
       a main inlet hydraulically connected to the first fuel supply conduit,
       an outlet hydraulically connected to the second fuel supply conduit, and
       an intermediate inlet hydraulically connected to the fuel return conduit, the intermediate inlet being hydraulically connected to the main inlet and the outlet downstream of the main inlet and upstream of the outlet, the intermediate inlet movable relative to the main inlet about a rotation axis of the fuel pump.

11. The fuel system of claim 10, further comprising an actuator operatively connected to the fuel pump, the actuator being operable to move the intermediate inlet relative to the main inlet in response to changes in pressure in the fuel return conduit.

12. The fuel system of claim 11, further comprising a controller communicatively coupled to the actuator, the controller being operable to operate the actuator in response to the changes in the pressure in the fuel return conduit.

13. A method of supplying a liquid fuel to an aircraft engine, comprising:
    operating a fuel pump to pump the fuel from a main inlet of the fuel pump toward the engine via an outlet of the pump,
    returning at least some of the fuel from downstream of the outlet to the fuel pump via an intermediate inlet of the fuel pump at a location of the fuel pump that is downstream of the main inlet and upstream of the outlet relative to a direction of fuel flow through the pump, and varying a distance by rotating about a rotation axis of the fuel pump between the intermediate inlet and the main inlet during the operating the fuel pump in response to a variation in pressure in the intermediate inlet.

14. The method of claim 13, wherein the aircraft engine is a gas turbine engine having a combustion chamber, and the operating the fuel pump to pump the fuel to the engine includes operating the fuel pump to pump the fuel toward the combustion chamber.

15. The method of claim 13, wherein the varying the distance includes decreasing the distance in response to the pressure exceeding an intermediate return pressure setpoint, and increasing the distance in response to the pressure falling below the intermediate return pressure setpoint.

16. The method of claim 13, wherein the varying the distance includes moving a first part of a housing of the fuel pump that defines at least in part an impeller cavity of the fuel pump, at least part of an impeller disposed in the impeller cavity, relative to a second part of the housing, one of the intermediate inlet and the main inlet being in the first part of the housing, and other one of the intermediate inlet and the main inlet being in the second part of the housing.

17. The method of claim 16, further comprising receiving a signal at a controller, the signal being indicative of the pressure, and operating, by the controller, an actuator to move the first part of the housing relative to the second part of the housing in response to changes in the pressure to regulate the pressure in the intermediate inlet toward an intermediate return pressure setpoint.

* * * * *